United States Patent [19]

Hosono

[11] Patent Number: 4,949,179
[45] Date of Patent: Aug. 14, 1990

[54] PICTURE DISPLAY DEVICE ALLOWING SEPARATE SELECTION AND DISCERNING OF MAIN AND SUB PROGRAMS USED FOR MAIN-SCREEN/SUB-SCREEN LAYOUT

[75] Inventor: Toshio Hosono, Saitama, Japan

[73] Assignee: Pioneer Electronic Corporation, Tokyo, Japan

[21] Appl. No.: 350,877

[22] Filed: May 12, 1989

[30] Foreign Application Priority Data

Oct. 6, 1988 [JP] Japan .................. 63-250794

[51] Int. Cl.⁵ ............... H04N 5/272; H04N 5/268; H04N 9/74
[52] U.S. Cl. .................... 358/183; 358/22; 358/181; 340/734
[58] Field of Search ............. 358/22, 183, 181; 340/734

[56] References Cited

U.S. PATENT DOCUMENTS

| 4,392,156 | 7/1983 | Duca et al. | 358/183 |
| 4,405,946 | 9/1983 | Knight | 358/183 |
| 4,668,999 | 5/1987 | De La Cierva, Sr. et al. | 358/22 |
| 4,694,343 | 9/1987 | Flora | 358/183 |
| 4,845,564 | 7/1989 | Hakamada et al. | 358/181 |

*Primary Examiner*—John K. Peng
*Attorney, Agent, or Firm*—Sughrue, Mion, Zinn, Macpeak & Seas

[57] ABSTRACT

A plurality of main-screen function changeover switches (each formed in a shape corresponding to a shape of the main-screen during a picture-in-picture mode of operation) are for selecting a main-screen program from inputs from a plurality of picture reproducing means, and a plurality of sub-screen function changeover switches (each formed in a shape corresponding to a shape of the sub-screen during a picture-in-picture mode of operation) are for selecting a sub-screen program from inputs from a plurality of picture reproducing means, with the plurality of main-screen function changeover switches and the plurality of sub-screen function changeover switches being paired with one another to mimic the main-screen/sub-screen layout format, with each pair allowing selection of a program being produced by a different reproduction means. It is possible concurrently to discern and select the source of a main-screen program and sub-screen program by viewing individual indicators associated with each individual switch of the plurality of main- and sub-screen function changeover switches.

11 Claims, 3 Drawing Sheets

PICTURE DISPLAY DEVICE ALLOWING SEPARATE SELECTION AND DISCERNING OF MAIN AND SUB PROGRAMS USED FOR MAIN-SCREEN/SUB-SCREEN LAYOUT

TECHNICAL FIELD OF THE INVENTION

The present invention relates to a picture display device equipped with a selectable picture-in-picture function which can be used for integrating a main-program or picture and a sub-program or picture into a main-screen/sub-screen layout format wherein the sub-program or picture is arranged to overlay and replace the main-program or picture for a predetermined sub-screen area portion of a display area of a display.

BACKGROUND OF THE INVENTION

A related picture display device is illustrated in the perspective view shown in FIG. 5.

In FIG. 5. 1 is a display consisting of a cathode-ray tube (CRT) or a liquid crystal display (LCD); 2 is a main-screen area, with a selected main-program or picture normally being displayed on the entire display screen of the display 1; and 3 is a sub-screen area which corresponds to a predetermined geometrical shape and is at a predetermined location of the display, for example, at the lower right-hand corner of the main-screen, with a selected sub-program being able to be selectively displayed within the sub-screen area to overlap a display of the selected main-program.

Reference numeral 4 is a display control device which selects and controls a program or picture to be displayed in the display 1; 5A, 5B and 5C are function changeover switches provided on one of the faces, for example, the front face of the display control device 4, wherein the function changeover switch 5A corresponds to a television changeover switch for selecting television receiver pictures, the function changeover switch 5B corresponds to a video tape reproducer (VTR) changeover switch for selecting video tape reproducer pictures, and the function changeover switch 5C corresponds to a video laser disk (LD) reproducer changeover switch for selecting laser disk reproducer pictures.

Reference numerals 6A, 6B and 6C are indicators which, for example, illuminate or otherwise change in appearance (e.g., a LCD) to indicate which of the function changeover switches 5A, 5B and 5C has been selected; 7 is a picture-in-picture (P/P) changeover or selector switch which can be selected to display or erase the sub-screen area 3 of the display 1 within the main-screen 2; and 8 is a P/P changeover indicator which, for example, illuminates or otherwise changes in appearance (e.g., a LCD) to indicate that the operation of the changeover switch 7 has been selected.

Next, the operation of the related device will be described using an example.

First, when a television receiver picture is selected by operating the function (i.e., television) changeover switch 5A, a television picture received via a television receiving tuner (not shown) is displayed on the main-screen 2 of the display 1.

At this time, the indicator 6A corresponding to the function changeover switch 5A is turned on (i.e.. illuminated or otherwise changed in appearance) indicating that the picture displayed on the main-screen is a television receiver picture.

Next, by depressing the P/P selector switch 7, a selection is made to operate in a picture-in-picture mode of operation, and thus to display a sub-program or picture on the sub-screen 3 to overlap a portion of the main-screen 2.

As a result of this selection, on the sub-screen 3 there is displayed a television receiver picture which is the same as television receiver picture in the main-screen 2, and the changeover indicator 8 is turned on (i.e., illuminated or otherwise changed) to indicate that the changeover switch 7 is operated to select a picture-in-picture function.

To change the sub-program or picture selected for display on the sub-screen 3 to one which is different from the main-program or picture on the main-screen, then one of non-selected function changeover switches 5B and 5C (a non-selection being indicated, for example, by unlit indicators 6B and 6C, respectively) can be depressed to select one of video tape reproducer (VTR) pictures or video laser disk (LD) reproducer pictures, respectively, For example, when the function (i.e., VTR) changeover switch 5B is depressed, a video tape reproducer picture is displayed on the sub-screen 3, and the indicator 6B is turned on.

Further, to change the main-program or picture selected for display on the main-screen 3, the changeover switch 7 is depressed again, as a result thereof, the sub-screen 3 is turned off and at the same time the indicator 6B and the changeover indicator 8 are turned off also, leaving the main-program or picture being displayed on the main-screen 2 or display 1 alone.

As a result of the foregoing deselection of the picture-in-picture function or mode of operation, the main-program or picture selected for display can again be changed. For example,when a desired function (i.e., LD) changeover switch 5C is depressed, a picture from the video laser disk reproducer is displayed on the main-screen 2 and the indicator 6C corresponding to the function changeover switch 5C is turned on to indicate that it is a video laser disk reproducer picture which is currently selected and being displayed as a main-program or picture.

With the related picture display device being constructed as described, the picture-in-picture function or mode of operation has to be deselected, or in other words, the sub-screen 3 has to be cleared in order to change a main-program or picture which is currently selected for display on the main-screen 2. Accordingly, there has been an inconvenient drawback that it is not possible to change the main-screen 2 while watching the sub-screen 3.

In addition, when the sub-screen 3 is to be changed while the picture-in-picture function or mode is selected, there has been a problem in that, since indicators corresponding to the main-screen 2 and the sub-screen 3 are not provided separately with respect to the function changeover switches, it is not possible to tell or discern which one of the programs or pictures of the functional changeover switches 5A–5C the main-screen 2 corresponds to, and which one of the programs or pictures of the functional changeover switches 5A–5C the sub-screen 3 corresponds to.

SUMMARY OF THE INVENTION

The present invention was aimed at solving the aforementioned problems.

It is, therefore,an object of the present invention to provide a picture display device which enables an easy switching of one of the main-screen and the sub-screen while fixing the other screen during a picture-in-picture function or mode of operation.

It is a further object of the present invention to provide easy identification of the respective program or picture which is being displayed on each of the main-screen and the sub-screen, respectively.

In the picture display device in accordance with the present invention, there are provided a plurality of main-screen function changeover switches (which in a preferred embodiment, are each formed in a shape corresponding to a shape of the main-screen during a picture-in-picture mode of operation) for selecting the main-screen, a plurality of sub-screen function changeover switches (which in a preferred embodiment are each formed in a shape corresponding to a shape of the sub-screen during a picture-in-picture mode of operation) for selecting the sub-screen, with the plurality of main-screen function changeover switches and the plurality of sub-screen function changeover switches being paired with one another to mimic the main-screen/sub-screen layout, with each pair allowing selection of a program being produced by a different reproduction means.

In the picture display device of the present invention, a plurality of main-screen function changeover switches and a plurality of sub-screen function changeover switches are provided corresponding to a respective plurality of picture reproducing means i.e., are provided in the aforementioned main-screen/sub-screen layout format, so that it becomes possible to discern and select the source of a main-program or picture for the main-screen by operating and viewing indicators associated with the plurality of the main-screen function changeover switches, and likewise a source of a sub-program or picture for the sub-screen can be selected by operating and viewing indicators associated with the plurality of sub-screen function changeover switches.

As a result of the aforementioned main-screen/sub-screen layout of the plurality of changeover switches, and further arrangements disclosed ahead, it becomes possible to select or change both a main-program or picture and sub-program or picture during a picture-in-picture mode of operation.

The novel features which are believed to be characteristic of the present invention, both as to its organization and as to its methods of operation, together with further objectives and advantages thereof will be better understood from the following description, considered in connection with the accompanying drawings, in which a presently preferred embodiment of the invention is illustrated by way of example. It is expressly understood, however, that the description of the preferred embodiment and drawings are for the purpose of illustration and description only, and are not intended as a definition of the limits of the invention.

BRIEF DESCRIPTION OF THE INVENTION

DETAILED DESCRIPTION OF THE PREFERRED EMBODIMENT OF THE INVENTION

A preferred embodiment of the present invention will be described with respect to the FIG. drawings.

Figure 1:
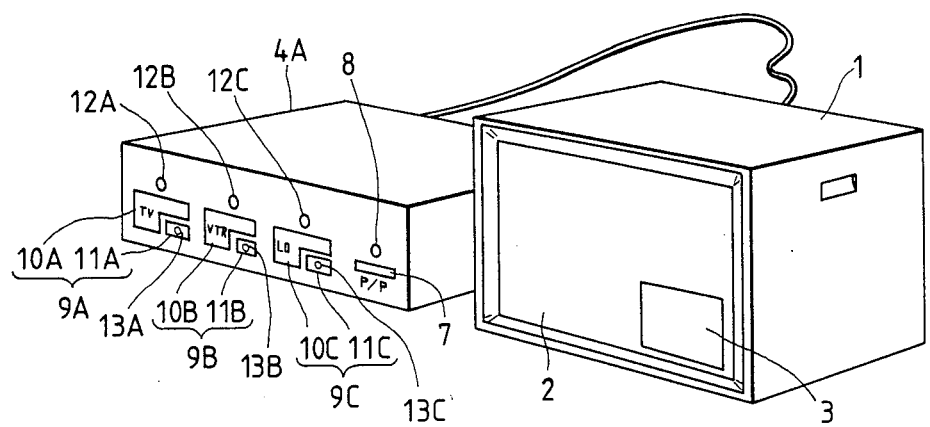
FIG. 1 is a perspective view of a picture display device of one embodiment in accordance with the present invention.
Figure 2:
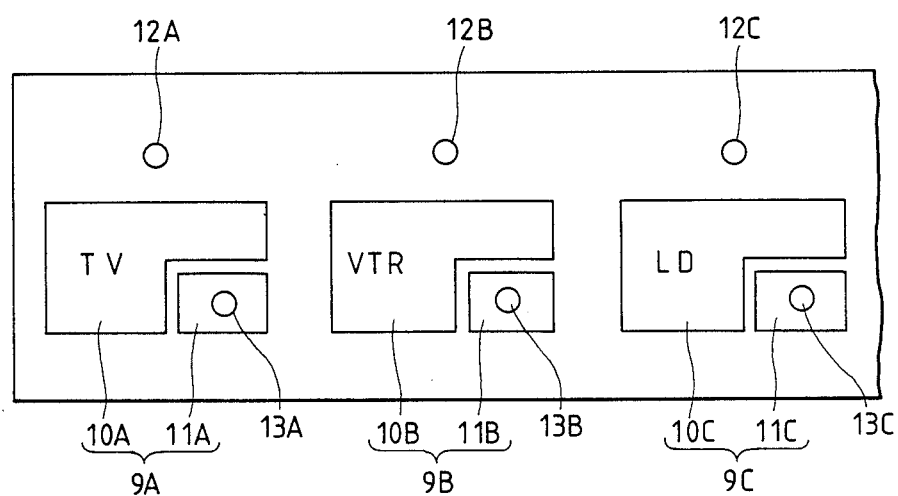
FIG. 2 is a partly enlarged front view of a panel portion of the picture display device shown in FIG. 1.

FIG. 1 shows a perspective view of the picture display device in accordance with an embodiment of the present invention, and FIG. 2 is a partly enlarged front view of a panel portion of the device in FIG. 1.

Figure 5:
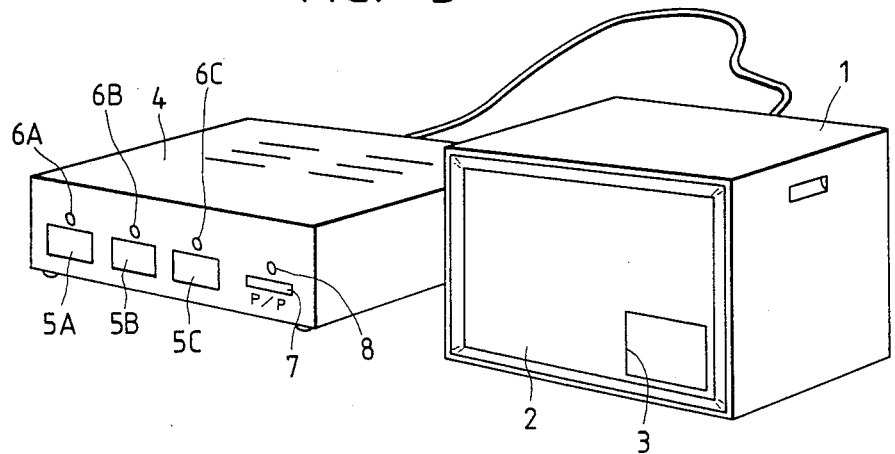
FIG. 5 is a perspective view of an example of a related picture display device.

In FIG. 1 and FIG. 2, symbols identical to those in FIG. 5 indicate identical or corresponding components.

Component 4A is a display control device which can be used to select and control a picture to be displayed in display 1; 9A, 9B and 9C are function changeover switches provided on one face, for example, a front face of the display control device 4A. The function changeover switch 9A corresponds to a television changeover switch for selecting television receiver pictures, the function changeover switch 9B corresponds to a video tape reproducer (VTR) changeover switch for selecting video tape reproducer pictures, and the function changeover switch 9C corresponds to a video laser disk (LD) changeover switch for selecting video laser disk reproducer pictures.

The function changeover switches 9A, 9B and 9C are composed of the main-screen function changeover switches 10A, 10B and 10C, respectively, that are formed, for example, in the shape of the main-screen 2 minus the lower right-hand corner (i.e., the shape of the main-screen 2 during a picture-in-picture mode of operation), namely, an inverted, horizontally elongated L-shape, and the sub-screen function changeover switches 11A, 11B and 11C that are formed, for example, in the shape of the missing lower right-hand corner in the main-screen function changeover switches 10A, 10B and 10C. representing approximately the shape or main-screen/sub-screen layout of the display screen when both of the corresponding switch pieces are combined.

Reference numerals 12A, 12B and 12C are main-screen indicators which, for example, illuminate or otherwise change to indicate which of the main-screen function changeover switches 10A, 10B and 10C of function changeover switches 9A. 9B and 9C that are in operation. Likewise, 13A, 13B and 13C are sub-screen indicators which illuminate or otherwise change to indicate which of the sub-screen function changeover switches 11A, 11B and 11C of function changeover switches 9A, 9B and 9C that are in operation. In a preferred embodiment, the sub-screen indicators 13A, 13B and 13C are formed integrally with the sub-screen function changeover switches 11A, 11B and 11C, respectively.

Next, the operation of the device will be described.

First, when a video tape reproducer picture is selected for a main-program by operating the main-screen function changeover switch 10B, for example, a picture being produced by the video tape reproducer is displayed on the main-screen 2 of the display 1.

At this time, the main-screen indicator 12B corresponding to the main-screen function changeover switch 10B is turned on or otherwise changed to indicate that the picture on the main-screen 2 is a picture being produced by the video tape reproducer.

Next, when the changeover switch 7 is depressed to select a picture-in-picture mode of operation and to display the sub-screen 3 in a portion of the main-screen 2, the changeover indicator 8 is turned on or otherwise changed to indicate the operation of the changeover switch 7 is turned on, and a picture is displayed on the sub-screen 3.

Further, at this time, a video tape reproducer picture (which is the same as that on the main-screen) is displayed on the sub-screen, and the sub-screen indicator 13B is turned on or otherwise changed to indicate that the picture displayed on the sub-screen 3 is a picture being produced by the video tape reproducer.

To change the picture on the sub-screen 3 to a sub-program or picture which is different from the picture on the main-screen 2, the sub-screen function (i.e., television) changeover switch 11A, for example, out of the sub-screen function changeover switches 11A and 11C corresponding to the unlit or non-selected sub-screen indicators 13A and 13C, is depressed. Then, a television reproducer picture is displayed on the sub-screen 3, the sub-screen indicator 13B is turned off and the sub-screen indicator 13A is turned on or otherwise changed to indicate that the picture on the sub-screen 3 is a television receiver picture.

Further, when the main-screen function (i.e., laser disk) changeover switch 10C. for example, out of the main-screen function changeover switches 10A and 10C corresponding to the unlit or non-selected main-screen indicators 12A and 12C, is depressed, a video disk reproducer picture is displayed on the main-screen 2, the main-screen indicator 12B is turned off and the main-screen indicator 12C is turned on or otherwise changed to indicate that the picture being displayed on the main-screen 2 is a video disk reproducer picture.

Next, when the changeover switch 7 is depressed again, the sub-screen 3 is cleared and the changeover indicator 8 and the sub-screen indicator 13A are turned off, with a result of only a main-program being displayed on the display 1.

Figure 3:
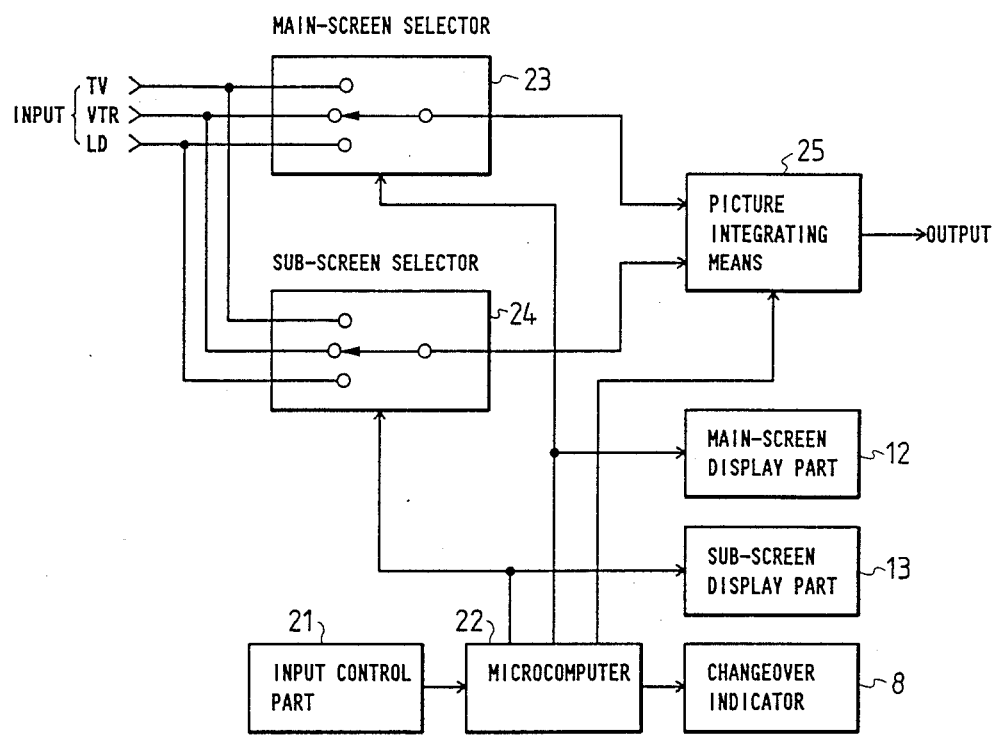
FIG. 3 is a block diagram showing an exemplary structure of the display control device.

FIG. 3 is a block diagram showing a structure of the display control device 4A.

In FIG. 3, 21 is an input control part consisting of the changeover selector switch 7 and the function changeover switches 9A, 9B and 9C shown in FIG. 1 and FIG. 2, and 22 is a microcomputer receiving the output of the input control part 21 and providing control according to this output from the input control part 21.

Component 23 is a main-screen selector which can be switched by means of an output from the microcomputer 22, 24 is a sub-screen selector which can be switched by means of an output from the microcomputer 22, 25 is a picture synthesizing part or picture integrating means which can operate in two modes, i.e., to output a normal main-program or picture corresponding to only a main-program being selected by the main-screen selector 23, or to integrate and output a picture-in-picture program or picture which is the synthesis or combination of pictures corresponding to the main-program and sub-program being selected by the main-screen and the sub-screen selectors 23 and 24, respectively. An operating mode of the picture integrating means 25 is controlled by the microcomputer 22.

Further, 12 is a main-screen display part consisting of the main-screen indicators 12A, 12B and 12C shown in FIG. 1 and FIG. 2 and 13 is a sub-screen display part consisting of the sub-screen indicators 13A, 13B and 13C shown in FIG. 1 and FIG. 2.

An operation of the device described above will be explained in terms of FIG. 3 and FIG. 4 (which contains a flowchart of the operation of the device).

First, by operating a main switch (not shown) the microcomputer 22 starts a controlling operation and judges whether a main-screen changeover switch of the input control part is depressed (step ST1).

When it is determined in the step ST1 that any one of the main-screen function changeover switches is depressed, the main-screen selector 23 is changed over so as to select a corresponding main-program or picture, and the main-program or picture so selected by the main-screen selector 23 is input to and then output from the picture synthesizing part 25, and at the same time the main-screen indicator corresponding to the main-screen display part 12 is turned on or otherwise changed accurately to reflect the selected main-program or picture being displayed on the display 1. (step ST2).

In contrast if it is determined in step ST1 that none of the main-screen function changeover switches is depressed, the main-screen indicator of the main-screen display part 12 is turned off (step ST3), and the picture (e.g.. a default or initializing picture) selected by the main-screen selector 23 is input to and output via the picture synthesizing part 25.

Next, in step ST4 it is determined whether a changeover switch is depressed after step ST2 or step ST3, and when a changeover switch is not depressed, the sub-screen indicator 8 is turned off (step ST5), a picture selected by the sub-screen selector 24 ceases to be output via the picture synthesizing part 25 and an operation of the device returns to the step ST1.

When on the other hand, in step ST4 it is determined that a changeover switch is depressed the sub-screen indicator 8 is turned on (step ST6), and a step ST7 is used to determined whether a sub-screen function changeover switch is depressed. If a sub-screen function changeover switch is depressed, then the sub-screen selector 24 is changed over so as to select a corresponding picture, and the sub-program or picture so selected by the sub-screen selector 24 is input to and output via the picture synthesizing part 25. At the same time, the appropriate sub-screen indicator corresponding to the sub-screen display part 13 is turned on or otherwise changed accurately to reflect the selected sub-program (step ST8). and returns to the step ST1.

To further particularize the picture-in-picture operation of the device, a control signal from the microcomputer 22 indicates that a picture-in-picture mode of operation is currently selected, and in response thereto, the picture synthesizing part or picture integrating means takes a main-program being received from the main-screen selector 23 and a sub-program being received from the sub-screen selector 24, synthesizes and outputs a picture-in-picture program for display on the display 1. A synthesizing or integrating operation may be provided by constructing the picture integrating means using a microprocessor.

Figure 4:
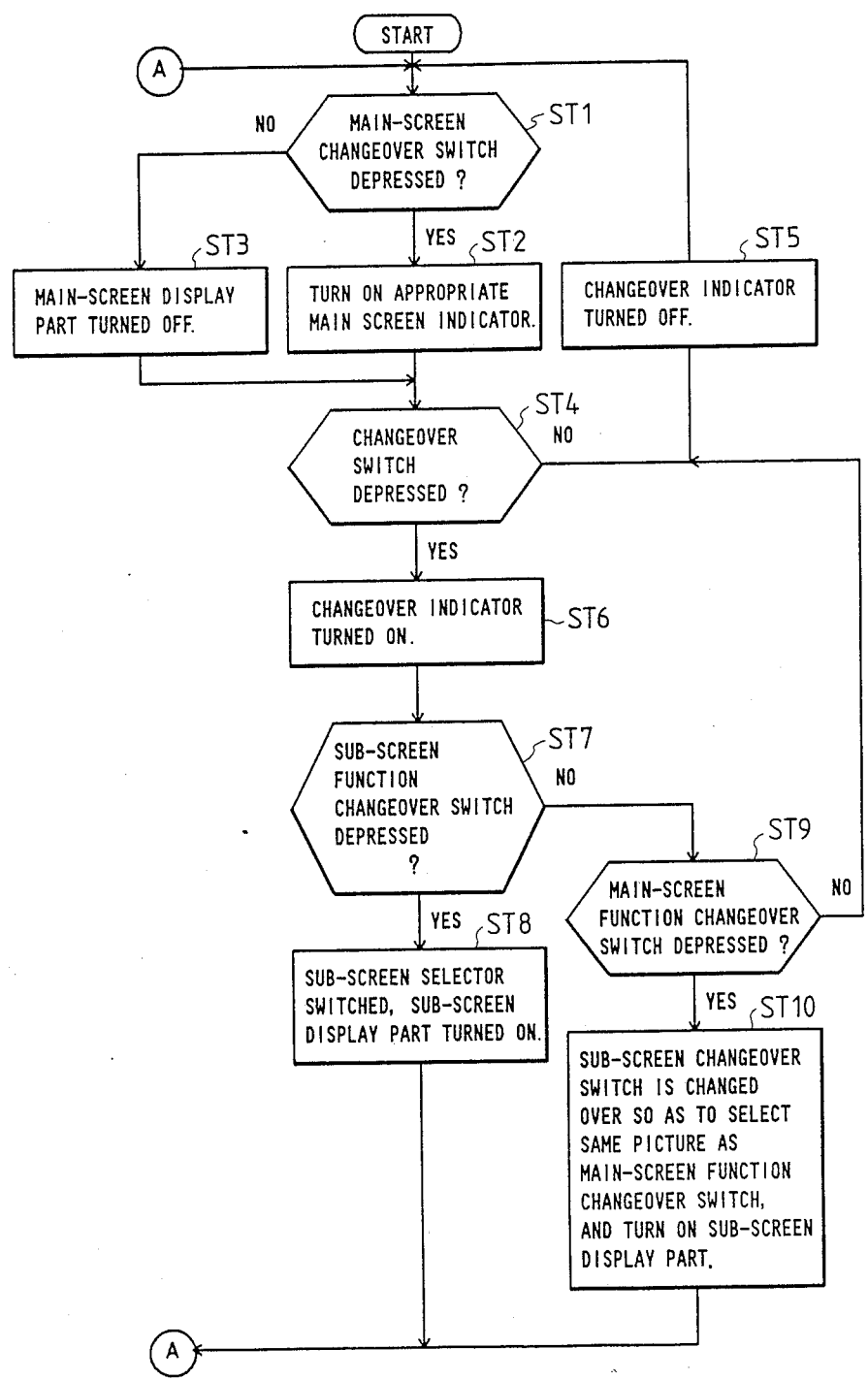
FIG. 4 is a flowchart for explaining the operation of the picture display device.

Returning to a description of the flow chart of FIG. 4, when it is determined in the step ST7 that a sub-screen function changeover switch is not depressed, then a step ST9 is used to determine whether a main-screen function changeover switch is depressed. If a main-screen function changeover switch is depressed, the sub-screen selector 24 is switched so as to select a picture which corresponds to that selected by the main-screen selector 23, and the picture selected by the sub-screen selector 24 is output via the picture synthesizing part 25. At the same time, the sub-screen indicator corresponding to the sub-screen display part 12 is turned on or otherwise changed accurately to reflect the selected sub-program or picture (step ST10, and returns to step ST1.

When in a step ST9 it is determined that a main-screen function changeover switch is not depressed, an operation of the device proceeds to step ST5.

It should be noted that in the present embodiment described in the above, the description was given in conjunction with an example in which the main-screen indicators 12A, 12B and 12C are provided separately from the main-screen function changeover switches 10A, 10B and 10C, and the sub-screen indicators 13A, 13B and 13C are formed integrally with the sub-screen function changeover switches 11A, 11B and 11C. However the main-screen indicators 12A, 12B and 12C may be formed integrally with the main-screen function changeover switches 10A, 10B and 10C, and the sub-screen indicators 13A, 13B and 13C may be formed separately from the sub-screen function changeover switches 11A, 11B and 11C.

Furthermore, the changeover switch 7 and the changeover indicator 8 may be formed integrally with each other.

As described in the foregoing, in accordance with the present invention, a plurality of main-screen function changeover switches and a plurality of sub-screen function changeover switches are provided corresponding respectively to a plurality of picture reproducing or selecting means, so that there can be obtained a result in which one of the main-screen and the sub-screen can easily be changed while the other screen is kept fixed.

Moreover, indicators are provided corresponding to each of the plurality of main-screen and sub-screen function changeover switches, so that there can be obtained a result that the pictures on the main-screen and the sub-screen can easily be identified.

Although a particular embodiment of the invention has been described and illustrated herein, it is recognized that many modifications and variations not discussed herein may readily occur to those skilled in the art, and consequently, it is intended that the claims be interpreted to cover such modifications and equivalents.

What is claimed is:

1. A picture-in-picture display device for allowing separate selection of a main-program and a sub-program for display on display means in a main-screen/sub-screen layout format, respectively, said device comprising:
    main-program means, including a plurality of manual main-screen function changeover switch means for manual selection by a user, each of said main-screen function changeover switch means allowing selection of a program input from a different one of a plurality of program reproducing means, and for outputting a selected program as a main-program for display in a main-screen portion of said display means; and
    sub-program means, including a plurality of manual sub-screen function changeover switch means which are different from said plurality of manual main-screen function changeover switch means, for manual selection by a user, each of said sub-screen function changeover switch means allowing selection of a program input from a different one of a plurality of program reproducing means and for outputting a selected program as a sub-program for display in a sub-screen portion of said display means.

2. A picture-in-picture display device for allowing separate selection of a main-program and sub-program for display on display means in a main-screen/sub-screen layout format, respectively, said device comprising:
    main-program means including a plurality of main-screen function changeover switch means, for allowing selection of one of a plurality of programs input from a plurality of program reproducing means, and outputting a selected program as a main-program for display in a main-screen portion of said display means:
    sub-program means including a plurality of sub-screen function changeover switch means which are different from said plurality of main-screen function changeover switch means, for allowing selection of one of a plurality of programs input from a plurality of program reproducing means and outputting a selected program as a sub-program for display in a sub-screen portion of said display means;
    wherein said individual main-screen switch means of said plurality of main-screen function changeover switch means allows selection of a program from a different source and is associated with main-program indicator means for indicating a selection/non-selection of said individual main-screen switch means; and
    wherein each individual sub-screen switch means of said plurality of sub-screen function changeover switch means allows selection of a program from a different source and is associated with sub-program indicator means for indicating a selection/non-selection of said individual sub-screen switch means.

3. A device as claimed in claim 2, further comprising picture-in-picture selection means for allowing selection/non-selection of a picture-in-picture mode of operation.

4. A device as claimed in claim 3, wherein said picture-in-picture selection means is associated with picture-in-picture indicator means for indicating a selection/non-selection of said picture-in-picture mode of operation.

5. A device as claimed in claim 4, further comprising:
    picture integrating means for receiving a selected said main-program from said main-program means and a selected said sub-program from said sub-program means, and, when said device is selected to said picture-in-picture mode of operation, for integrating said main-program and said sub-program into said main-screen/sub-screen layout format wherein said sub-program is arranged to overlay and replace said main-program for a predetermined sub-screen area portion of a display area of display means.

6. A device as claimed in claim 5:
    wherein said predetermined sub-screen area portion corresponds to a predetermined geometrical shape and is at a predetermined location of said display means, and a main-screen area portion corresponds to a remaining area portion of a display area of display means; and
    wherein said individual main-screen switch means and said individual sub-screen switch means are paired with one another to mimic said main-screen/sub-screen layout, with said individual main-screen switch means each being formed in a shape corresponding to a shape of said main-screen area portion during a picture-in-picture mode of operation, and individual sub-screen switch means each being formed in a shape corresponding to a shape of said sub-screen area portion.

7. A device as claimed in claim 6, wherein there are three main-/sub-screen switch means pairs, with a first pair allowing selection/non-selection of a program being produced by television receiver means, a second pair allowing selection/non-selection of a program being produced by video tape reproducer means, and a third pair allowing selection/non-selection of a program being produced by a laser disk reproducer means.

8. A device as claimed in claim 7, wherein each said sub-program indicator means is integrally formed with said individual sub-screen switch means.

9. A device as claimed in claim 8, wherein each said main-program indicator means is integrally formed with said individual main-screen switch means.

10. A picture display device for selecting a picture signal from among signals input from a plurality of picture reproducing means and displaying it on a display screen as a main screen, and for selecting a picture signal from among signals input from said plurality of picture reproducing means and displaying it on a sub-screen which is a portion of said main-screen, said device comprising:
   a plurality of manual main-screen function changeover switches for manual selection by a user for selecting a main picture signal from a plurality of picture reproducing means, said main-screen function changeover switches being provided in a shape corresponding to a shape of said main-screen; and
   a plurality of manual sub-screen function changeover switches for manual selection by a user for selecting a sub picture signal from a plurality of picture reproducing means, said sub-screen function changeover switches being provided in a shape corresponding to a shape of said sub-screen;
   wherein said plurality of manual main-screen function changeover switches and said plurality of manual sub-screen function changeover switches are paired with one another to form a plurality of changeover switch groups, a layout of each of which mimics a main-screen/sub-screen layout of said display screen.

11. A picture display device for selecting a picture signal from among signals input from a plurality of picture reproducing means and displaying it on a display screen as a main screen, and for selecting a picture signal from among signals input from said plurality of picture reproducing means and displaying it on a sub-screen which is a portion of said main-screen, said device comprising:
   a plurality of main-screen function change over switches for selecting a main picture signal from a plurality of picture reproducing means, said main-screen function changeover switches being provided in a shape corresponding to a shape of said main-screen; and
   a plurality of sub-screen function changeover switches for selecting a sub picture signal from a plurality of picture reproducing means, said sub-screen function changeover switches being provided in a shape corresponding to a shape of said sub-screen;
   wherein said plurality of man-screen function changeover switches and said plurality of sub-screen function changeover switches are paired with one another to form a plurality of changeover switch groups, a layout of each of which mimics a main-screen/sub-screen layout of said display screen; and
   wherein there are provided main-screen indicators for indicating operation/non-operation corresponding respectively to said plurality of main-screen function changeover switches, and sub-screen indicators for indicating operation/non-operation corresponding respectively to said plurality of sub-screen function changeover switches.

* * * * *